United States Patent [19]

Zupo

[11] 4,196,695
[45] Apr. 8, 1980

[54] AQUARIUM LIFE SUPPORT SYSTEM

[76] Inventor: Ralph A. Zupo, 1818 Coronado Ave., Youngstown, Ohio 44504

[21] Appl. No.: 878,589

[22] Filed: Feb. 16, 1978

[51] Int. Cl.² ............................................ A01K 64/00
[52] U.S. Cl. ........................................................ 119/5
[58] Field of Search ........................................ 119/3, 5

[56] References Cited

U.S. PATENT DOCUMENTS

| | | | |
|---|---|---|---|
| 1,974,068 | 9/1934 | Greensaft | 119/5 |
| 3,232,271 | 2/1966 | DeJose et al. | 119/5 |
| 3,316,882 | 5/1967 | Renwick | 119/5 |
| 4,082,062 | 4/1978 | Rodemeyer | 119/5 |

*Primary Examiner*—Russell R. Kinsey
*Assistant Examiner*—Robert P. Swiatek
*Attorney, Agent, or Firm*—Webster Harpman

[57] ABSTRACT

An aquarium life support system comprises a tank with transparent walls with a watertight bottom having a central drain opening and additional openings through which air supply tubes and a heating device are extended. A movable support below the tank bottom includes an air pump, gang valves for the air supply tubes and a control unit for the heater. The construction is such that the bottom portion normally hides the pump, air valves and heater control together with a drain line in communication with the central drain opening. A single power supply cord extends from the life support system to an appropriate power source.

3 Claims, 2 Drawing Figures

AQUARIUM LIFE SUPPORT SYSTEM

BACKGROUND OF THE INVENTION (1) Field of the Invention:

This invention relates to aquariums and more particularly to a life support system for an aquarium.

(2) Description of the Prior Art:

No prior art patents are known wherein a life support system for an aquarium discloses the arrangement of a package including an air pump, gang valves for controlling the air therefrom, and a control unit for a heater are arranged in close coupled relation to the aquarium and normally hidden from view thereby.

Summary of the Invention

An aquarium life support system includes a tank having transparent walls and a watertight bottom portion with a drain opening therein and additional openings through which air supply pipes and an electric cord extend. A support structure for the aquarium includes a movably positioned section mounting an air pump, gang valves for controlling the air supplied thereby and a control unit for a heater in the aquarium arranged for out of sight location beneath the bottom portion of the tank with a power supply cord extending therefrom.

DESCRIPTION OF THE PREFERRED EMBODIMENT

Figure 1:
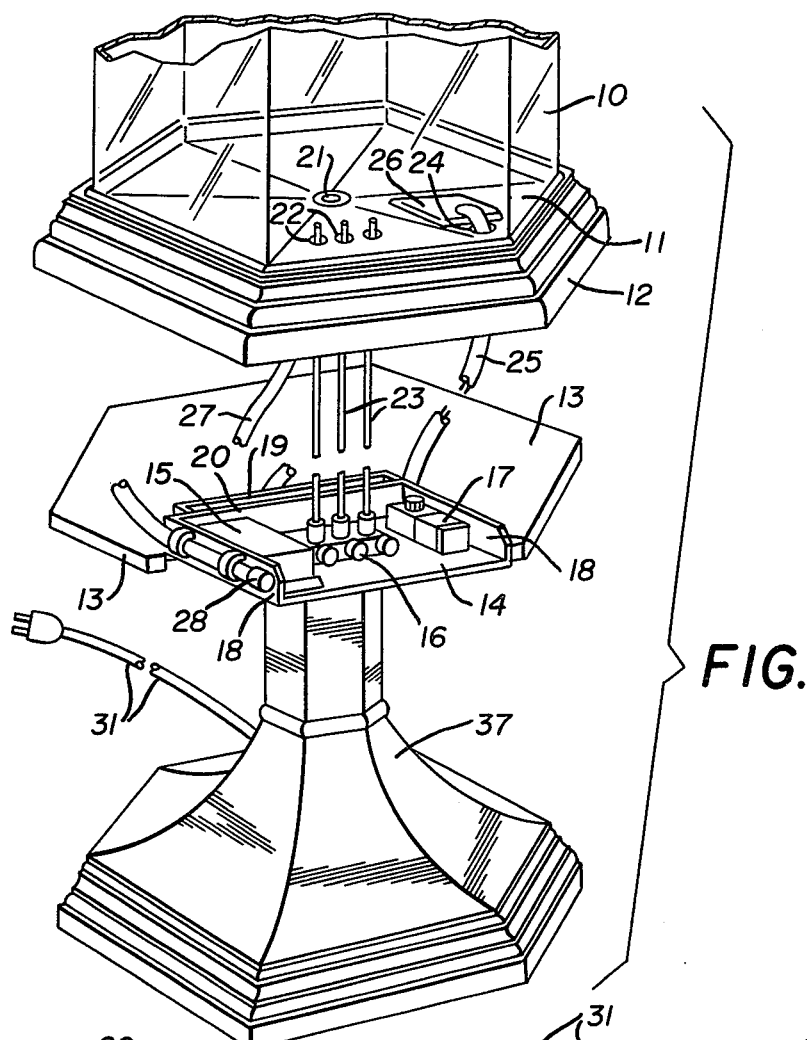
FIG. 1 is a perspective view of the aquarium life support system with parts in exploded relation.

In the form of the invention chosen for illustration and description herein, an aquarium as seen in FIG. 1 of the drawings comprises a transparent walled tank 10 with a watertight bottom portion 11 which includes an outwardly and downwardly flanged skirt 12. A support structure 13 engages the skirt 12 of the watertight bottom portion 11 of the tank 10 in supporting relation and provides usable space between the bottom portion 11 and the same in which a movably positioned section 14 locates an air pump 15, a gang valve assembly 16 and a heater control unit 17.

The movable section 14 has side and back wall 18 and 19 respectively and a longitudinally extending partition 20 in spaced parallel relation to the back wall 19.

Figure 2:
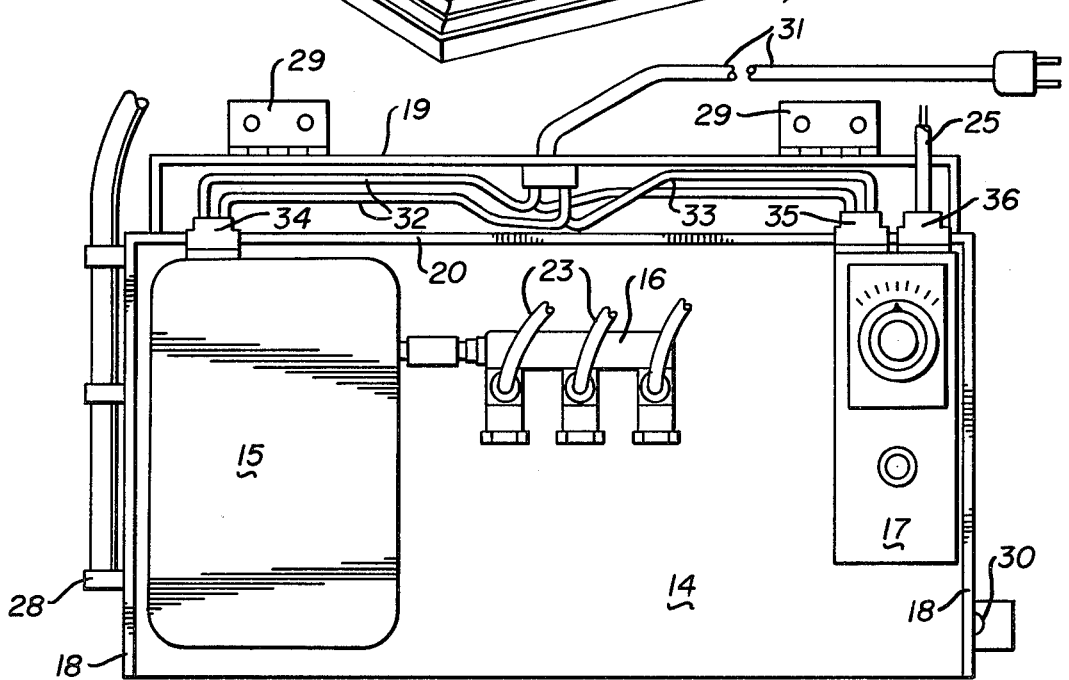
FIG. 2 is an enlarged detailed plan view of the movable section of the aquarium support seen in FIG. 1.

Still referring to FIG. 1 of the drawings, the bottom portion 11 will be seen to have a drain opening 21 and several secondary openings 22 through which air supply tubes 23 are extended in sealing relation. Still another opening 24 enables an electric cord 25 to be positioned therethrough in sealing relation for supplying a heater pad 26. A flexible tube 27 communicates with the drain opening 21 and with a valve 28 mounted on one of the side walls 18 of the movable section 14 of the support 13. The movable support 14 is hinged at its rearmost edge as defined by the back wall 19 to the support 13 by a pair of hinges 29 and a friction latch 30 engages an adjacent portion of the support 13 to normally position the movable section 14 in horizontal relation as shown in FIG. 1 of the drawings. A power supply cord 31 extends from the back wall 19 of the movable section 14 and as best seen in FIG. 2 of the drawings communicates with conductors 32 and 33 which are positioned within the area between the partition 20 and the back wall 19 and lead to sockets 34 and 35 which are mounted in the partition 20 and arranged to receive prong-like connectors that extend from the air pump 15 and the heater control unit 17. A third socket 36 establishes a separate connection between the electric cord 25 and the heater control unit 17 and the arrangement is such that the air pump 15 along with the gang valves 16 and the heater control unit 17 can be unplugged from the sockets 34, 25 and 36 and removed from the movable section 14 for repair or replacement.

The power supply cord 31 may be extended downwardly from the movable section 14 through a pedestal base 37 as seen in FIG. 1 and extended therefrom to an electric power outlet.

It will thus be seen that the aquarium life support system disclosed herein packages the air pump, gang valves controlling the output thereof, and the control unit for the heater of the aquarium in a readily accessible but normally hidden position immediately below the bottom portion of the aquarium tank, the arrangement being such that the movable section 14 can be manually moved downwardly for adjustment of the gang air valves and the heater control thereby making the same readily accessible.

The drain line 27 and its valve 28 also move into readily accessible position when the movable section 14 is moved downwardly relative to the horizontal support 13. It will be obvious that a portion of the horizontal support 13 is cut away to receive and position the section 14 which is hingedly positioned in the cut away portion.

Although but one embodiment of the present invention has been illustrated and described, it will be apparent to those skilled in the art that various changes and modifications may be made therein with departing from the spirit of the invention and having thus described my invention what I claim is:

I claim:

1. In an aquarium containing a single body of liquid and having transparent walls and a bottom portion, a downturned flange on the peripheral edge of said bottom portion, a stand for said aquarium comprising a pedestal base having a two-part flat top normally positioned within the area of said downturned flange, said two-part flat top positioned in spaced relation to said bottom portion, one part of said two-part flat top being fixed to said pedestal base, hinges attaching the other part of said two-part flat top to said fixed part in an opening therein for hinged movement toward and away from said bottom portion, an air pump, a gang valve in communication therewith and a heater control unit mounted on said other part of said flat top, a secondary valve on said other part and a flexible drain line extending between said secondary valve and a drain opening in said bottom portion, at least one flexible air supply tube extending between said gang valve and an opening in said bottom portion, a heater pad on said bottom portion and an electric cord extending therefrom to said heater control unit and a power supply cord extending from said air pump and heater control unit to a power source.

2. The improvement in an aquarium set forth in claim 1 and wherein said peripheral flange on said bottom portion normally engages said two-part flat top and is arranged to enclose said other part and the air pump gang valve and heater control unit thereon.

3. The improvement in an aquarium set forth in claim 1 and wherein a friction catch on said fixed flat top part normally holds said other part of said flat top on the same plane as said fixed flat top part.

* * * * *